United States Patent [19]

Brown et al.

[11] 4,400,811

[45] Aug. 23, 1983

[54] DETECTING ACCURRENCES OF REDUNDANT DIGITAL CODEWORDS

[75] Inventors: James H. Brown, Garland; Johannes Grande, Richardson, both of Tex.

[73] Assignee: Rockwell International Corporation, El Segundo, Calif.

[21] Appl. No.: 252,094

[22] Filed: Apr. 8, 1981

[51] Int. Cl.³ .......................... G06F 11/08; G06F 7/02
[52] U.S. Cl. ..................................... 371/69; 340/146.2
[58] Field of Search ............................ 371/69; 375/94; 340/146.2

[56] References Cited

U.S. PATENT DOCUMENTS 3,863,215  1/1975  Mc Grogan, Jr. ..................... 371/69
3,919,690  11/1975 Field et al. ............................. 371/69
3,973,242  8/1976  Field et al. ......................... 371/69 X
4,312,074  1/1982  Pautler et al. ..................... 371/69 X Primary Examiner—David H. Malzahn
Attorney, Agent, or Firm—Michael E. Taken; V. Lawrence Sewell; Howard R. Greenberg

[57] ABSTRACT

Detection of repeatedly transmitted redundant digital codewords is provided by checking corresponding bi-positions for consecutive n bit codewords, counting the number of ones and zeros for each bit-position. When there is at least a preselected threshold $J_M$ of equal bit values for each of the n bit-positions of the codewords, in M or less consecutive codewords, the detection process is complete.

11 Claims, 2 Drawing Figures

DETECTING ACCURRENCES OF REDUNDANT DIGITAL CODEWORDS

TECHNICAL FIELD

The invention relates to detection of redundant digital codewords repeatedly transmitted over a digital transmission system, (including analog links using modems or the like), for example digital radio and telephone systems.

BACKGROUND

Various digital codeword detectors and detection schemes are known in the art. One technique involves scanning for N consecutive identical codewords. For example, if the codeword is 8 bits long, then all 8 bits of a first codeword must identically match all 8 bits of the second codeword. If successful, then the third codeword is tested for an identical match of all 8 bits, and so on up to N codewords.

Another detection technique involves scanning for N consecutive occurrences of grouped majority vote equal values for all bit-positions of the codeword. For example, a first group of five codewords is tested for each bit-position. In the first bit-position of each of the five codewords, a majority vote determines whether a one or a zero will be assigned to the first bit-position in a trial codeword, i.e., a three out of five majority vote in the first bit-position of the five codewords determines the first bit-position value in the trial codeword. A majority vote is then taken of the values in the second bit-positions in the five codewords, which three out of five majority vote determines the value of the second bit-position in the trial codeword. If the codeword is 8 bits long, then this process continues until all 8 bit-positions have been tested and an 8 bit trial word has been generated. A new group of five more codewords is then tested in like manner to generate a second trial word. If this second trial word is identical to the first trial word, then a third group of five codewords is tested, and so on until N consecutive identical trial words have been generated.

SUMMARY

The present invention provides an improved digital codeword detection system, characterized by its simplicity and efficiency.

Corresponding bit-positions for consecutive codewords are checked, counting the number of ones and zeros for each bit-position. When there are at least $J_M$ equal bit values (ones or zeros) for all n bit-positions of the codeword, in M or less consecutive codewords, the detection process is complete.

Received data containing the codewords is stored in memory having a capacity of at least $n \times M$. Every $n^{th}$ bit is read from the memory, preferably starting with one of the bits of the most recent codeword. Two different counters count the ones and zeros in this sequence of M bits, and the two counts are compared with the preset value $J_M$. If either counter equals or exceeds $J_M$, the outputs of comparators provide both a bit detected signal and a bit value signal. The bit detected signal is stored in a memory having a capacity of at least n bits, and the bit value signal is stored in a memory having a capacity of at least n bits.

The sequence is repeated for another set of M bits by reading every $n^{th}$ bit from the first memory starting with another of the bits of the most recent codeword. After all n bit-positions have been checked, the bit detected memory yields a codeword detected signal if a bit detected signal has been received for each of the n bit-positions. The bit value memory yields a codeword value provided by the values in the n bit-positions therein.

DETAILED DESCRIPTION

Figure 1:
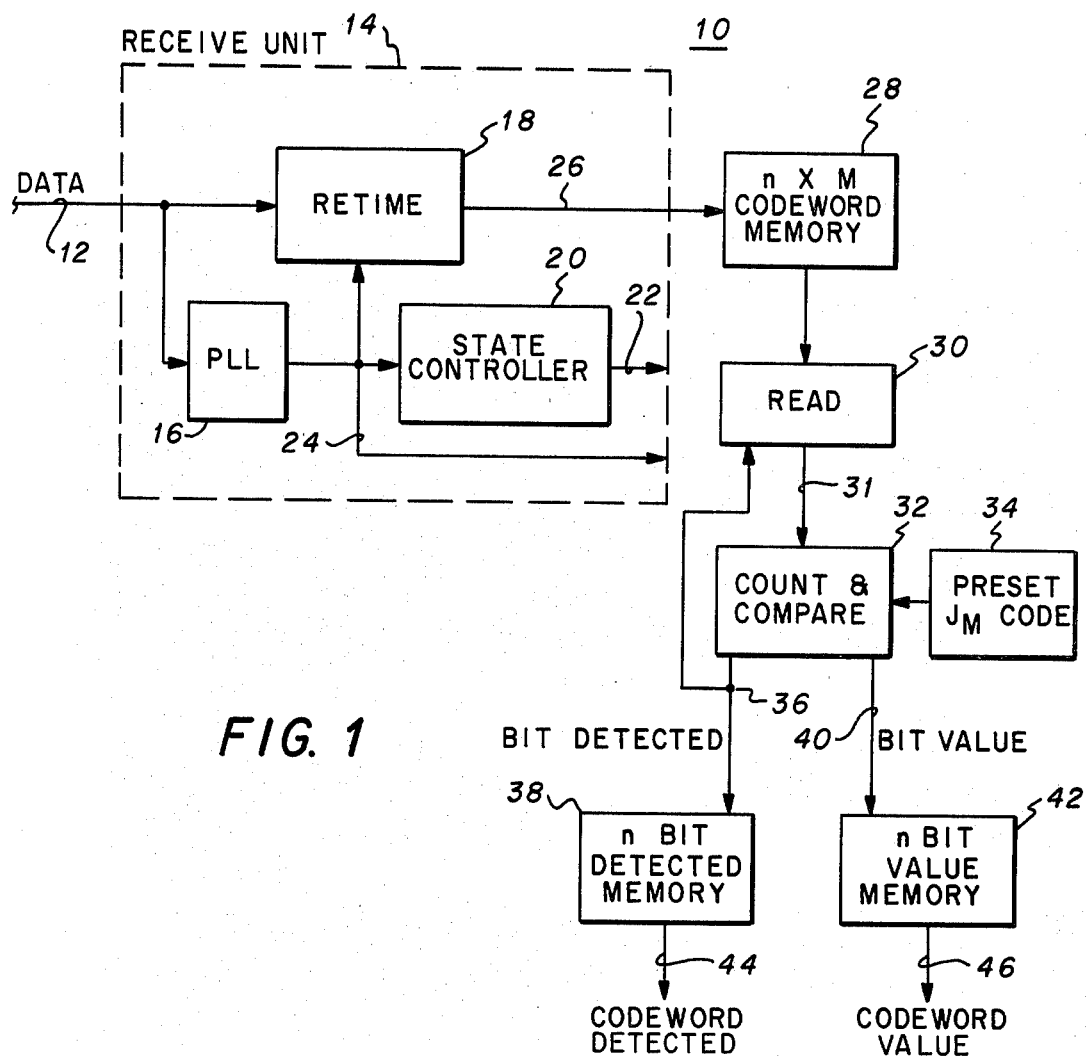
FIG. 1 is a schematic circuit diagram of a digital codeword detector constructed in accordance with the invention.

FIG. 1 shows a digital codeword detector generally designated 10. Data from transmission line 12 is received by a receive unit 14. This receive unit is known in the art, and will only be briefly described. A clock recovery circuit 16, such as a phase locked loop, extracts the clock signals from the data. These clock signals are delivered to a retime circuit 18, such as a retime flip-flop, to retime or synchronize the data to the recovered clock. The extracted clock signals from circuit 16 are also delivered to a state controller 20 which outputs framing configuration and bit sequencing identification on bus 22. The extracted clock signals from circuit 16 are also delivered on output clock line 24. Buses 22 and 24 are connected to the remaining circuitry, to be described, for bit sequencing and clocking.

The data on line 12 may be either serial or parallel. In some applications involving high speed serial or parallel data on transmission line 12, a demultiplexing unit, not shown, may be provided at the output of circuit 18 to output a plurality of parallel data channels as controlled and timed by the bit sequencing and framing configuration identification from state controller 20. The data output on bus 26 may be serial or parallel.

Data from receive unit 14 is stored in a codeword memory 28 having a capacity of $n \times M$, where n is the number of bits in a codeword and M is a number of consecutive codewords in a given framing format or configuration. The framing configuration identification output on bus 22 from state controller 20 provides group synchronization signals, and provides word synchronization signals for noncyclic codes. These synchronization signals control bit sequencing for identifying the codeword bit-positions of the received group of data bits, and control entry into memory 28. The codeword bit-positions are either absolute (for noncyclic codes) or relative to an arbitrarily chosen start of a codeword (cyclic codes). Codeword memory 28 is any form of storage which can be accessed for storage and retrieval of data, e.g., shift register, random access memory, etc.

Read logic 30 reads every $n^{th}$ bit from memory 28 starting with one of the bits of the most recent codeword as designated by the bit sequencing control on bus 22 from state controller 20. Read logic 30 transfers these data bits to count and compare logic 32. Read logic 30 reads the value of the same bit-position for successive, and successively older, codewords. This read process continues until M bits have been read or until the count and compare logic 32 signals that it has made a positive determination of the bit value, whichever comes first. Read logic 30 then reads every $n^{th}$ bit from memory 28 starting with another bit of the most recent codeword as controlled by the bit sequencing configuration on bus 22. In the same manner, the read process is repeated for all n bit-positions of the codewords.

Count and compare logic 32 determines the number of ones and zeros in each sequence of bits received from memory 28 and compares these numbers to a preset threshold value $J_M$, designated 34. When the number of ones or zeros equals or exceeds $J_M$, a bit detected signal 36 is generated which is fed back to read logic 30 to terminate the read process. The bit detected signal 36 is also sent to a bit detected memory 38 having a capacity of at least n bits, which keeps track of the number of detected bits in the codeword. Count and compare logic 32 also transmits a bit value signal 40 to a bit value memory 42 having a capacity of at least n bits, which saves the values of the different bit-positions of the codeword. The bit-positions for the detected bit values are determined by the bit sequencing configuration from bus 22 of state controller 20. Read logic 30 and count and compare logic 32 may be replicated to allow for sufficient processing power, i.e., parallel processing, if needed for sufficiently fast processing of the bit-positions in the codewords. When all bits of the codeword have been detected, a codeword detected signal 44 is generated by bit detected memory 38. Bit value memory 42 yields the codeword value on bus 46.

Figure 2:
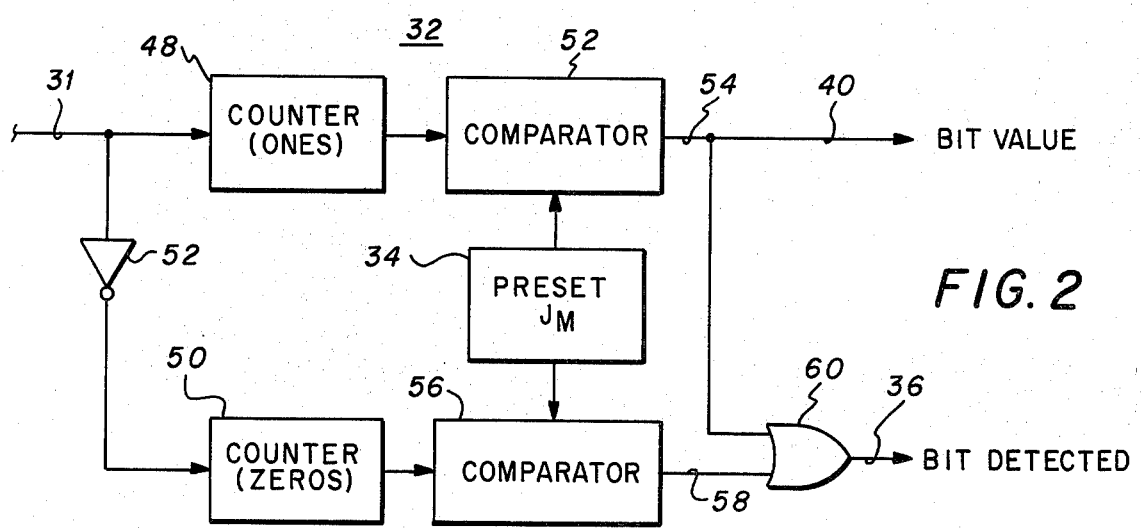
FIG. 2 is a schematic circuit diagram of the count and compare logic of FIG. 1.

FIG. 2 shows count and compare logic 32 of FIG. 1. Data codeword bits on line 31 from read logic 30 are delivered to separate counters 48 and 50. Counter 48 is incremented by each bit having a value of one, and is thus a ones counter. Counter 50 receives the data bits through an inverter 52 such that counter 50 is incremented by bit values of zero on line 31, and hence counter 50 is a zeros counter. The number of ones counted by counter 48 is delivered to a comparator 52 which compares the ones count against the preset threshold number $J_M$. If the number of ones exceed $J_M$, then a high signal is generated at output 54. The number of zeros counted by counter 50 is delivered to a comparator 56 which compares this count against $J_M$ and outputs a high signal at 58 if the zeros count exceeds $J_M$.

Outputs 54 and 58 are input to an OR gate 60 which yields bit detected signal 36 of FIG. 1 if either comparator 52 or 56 goes high. $J_M$ is usually chosen to be a fairly high percentage of M, depending on the degree of detection confidence desired. If output 54 goes high, the bit value for that bit-position is one, and output 54 provides bit value signal 40 of FIG. 1. If output 58 goes high, the bit value for that bit-position is zero, and output 54 is low to thus provide bit value signal 40 as a zero. Counters 48 and 50 are reset to 0 by the bit sequencing control on bus 22 when the count and compare logic starts processing a new bit-position.

The invention includes the method for detecting redundant digital codewords repeatedly transmitted over a digital transmission system, namely: reading a given bit-position of each of M codewords; counting the values of the M bit-positions; comparing this count against a predetermined threshold $J_M$ and outputting a bit value signal and a bit detected signal when the count equals or exceeds $J_M$; and repeating this sequence of steps for each of the remaining bit-positions in the codewords. Ones and zeros are separately counted for the M bit-positions, and the ones count and the zeros count are separately compared against the same $J_M$. The outputs of the comparisons are ORed to provide the bit detected signal. The bit value signal is provided by the output of one of the comparisons.

In the preferred method, a group of M codewords are stored in codeword memory 28 having a bit capacity of at least n×M, where n is the number of bits in a codeword. Every $n^{th}$ bit is read from memory 28 starting with a given bit. The ones and zeros in the M bits are counted and compared against $J_M$. If either count equals or exceeds $J_M$ then the bit value and bit detected signals are generated. The bit value signal is stored in a memory having a capacity of at least n bits, and the bit detected signal is stored in a memory having a capacity of at least n bits. These steps are repeated for each of the remaining of the n bit-positions in the codewords. A codeword detected signal is generated from the bit detected signal memory if the latter reaches a content of n bits. A codeword value signal is provided by the bit value signal memory.

Memory 28 is initially filled with M codewords. If this group of M codewords does not provide n detections, i.e., there are less than n bit detected signals as evidenced by memory 38 having a content less than n, then memory 28 is updated with one new codeword and the oldest codeword is discarded or written over. Data may be written to memory 28 one bit at a time (n entries make up a codeword) or several bits at a time if the data is received on parallel circuits or is demultiplexed into parallel circuits. If memory 28 is updated bit by bit, the respective bit-position of the codeword is checked as soon as it is written to memory 28 and the comparison is finished in time to start processing the next bit position as soon as the next bit is written to memory 28. The oldest bit in memory 28 is discarded or overwritten. If memory 28 is updated word by word, the comparison is started with any of the bit-positions and the processing of all n bit-positions is completed before the next word is stored in memory 28.

It is recognized that various modifications are possible within the scope of the appended claims.

What is claimed is:

1. A method for detecting redundant digital codewords repeatedly transmitted over a digital transmission system, comprising determining the values of bits in corresponding bit-positions of consecutive n bit codewords and providing, in response to said values, a codeword detected signal when there are at least $J_M$ equal bit values for each of the n bit-positions of the codewords, in M consecutive codewords, where $J_M$ is a preselectable threshold less than M.

2. The invention according to claim 1 wherein said determining of values includes counting ones and zeros in said corresponding bit-positions, and said providing includes comparing the two counts against $J_M$ such that a bit detected signal is generated if either count equals or exceeds $J_M$, and said codeword detected signal is provided after bit detected signals have been generated for all n bit-positions.

3. A method for detecting redundant digital codewords repeatedly transmitted over a digital transmission system, comprising:
   reading a given bit of each of a plurality of the M codewords;
   counting, for plural bit values, the number of said bits assuming each bit value;
   comparing said count against a predetermined threshold $J_M$ and outputting a bit value signal and a bit detected signal when said count equals or exceeds $J_M$; and
   repeating the above sequence of steps for each of the remaining bit-positions in the codewords.

4. The invention according to claim 3, wherein:
said step of counting includes separately counting ones and zeros for said M bits; and
said step of comparing includes separately comparing each of the counted number of ones and the counted number of zeros against the same said $J_M$.

5. The invention according to claim 4 wherein said step of outputting includes ORing the outputs of said comparisons to provide said bit detected signal.

6. The invention according to claim 5 wherein said bit value signal is provided by the output of said ones comparison.

7. A method for detecting redundant digital codewords repeatedly transmitted over a digital transmission system, comprising:
storing M codewords in a memory having a bit capacity of at least $n \times M$, where n is the number of bits in a codeword;
reading from said memory a plurality of bits with memory locations spaced every $n^{th}$ bit, starting with a given bit;
counting ones and zeros in the bits read;
comparing the counted number of ones and zeros against a predetermined threshold $J_M$, and outputting a bit value signal and a bit detected signal when either count equals or exceeds $J_M$;
storing said bit value signal in a memory having a capacity of at least n bits;
storing said bit detected signal in a memory having a capacity of at least n bits;
repeating the preceding five steps for each of the remaining bit-positions in the codewords;
providing a codeword detected signal from said bit detected signal memory if the latter reaches a content of n bits; and
providing a codeword value signal from said bit value signal memory.

8. A digital codeword detector for detecting redundant codewords repeatedly transmitted over a digital transmission system, comprising:
a first memory having a bit capacity of at least $n \times M$ for storing M codewords, each n bits long;
means for reading from said first memory a given bit-position of each of a plurality of M codewords;
count and compare means for counting, for plural bit values, the number of said bit-positions read which contain each bit value and comparing said count against a predetermined threshold $J_M$, and outputting a bit value signal and a bit detected signal when said count equals or exceeds $J_M$;
a second memory, having a capacity of at least n bits and responsive to said count and compare means, for storing said bit detected signal, and outputting a codeword detected signal if its content reaches n bits; and
a third memory, having a capacity of at least n bits and responsive to said count and compare means, for storing said bit value signal, and outputting a codeword value signal.

9. The invention according to claim 8 wherein said count and compare means comprises:
a ones counter for counting the number of ones in said M bit-positions;
a zeros counter for counting the number of zeros in said M bit-positions;
a ones comparator for comparing the number of counted ones against $J_M$; and
a zeros comparator for comparing the number of counted zeros against the same said $J_M$.

10. The invention according to claim 9 wherein said count and compare means further includes means responsive to said ones comparator and said zeros comparator to provide said bit detected signal when either said ones or zeros count equals or exceeds $J_M$.

11. The invention according to claim 10 wherein said bit value signal is provided by the output of one of said comparators.

* * * * *

UNITED STATES PATENT AND TRADEMARK OFFICE
CERTIFICATE OF CORRECTION

PATENT NO. : 4,400,811
DATED : August 23, 1983
INVENTOR(S) : James H. Brown and Johannes Grande It is certified that error appears in the above-identified patent and that said Letters Patent are hereby corrected as shown below:

IN THE TITLE: Delete "Accurrences" and substitute therefor --Occurrences--.

IN THE ABSTRACT: Line 2, delete "bi-" and substitute therefor --bit---.

Signed and Sealed this

Twenty-fourth Day of April 1984

[SEAL]

Attest:

GERALD J. MOSSINGHOFF

Attesting Officer

Commissioner of Patents and Trademarks